June 30, 1925.
H. J. NELSON
1,544,029
WATER LIFTER AND CONDENSER
Filed Dec. 26, 1922
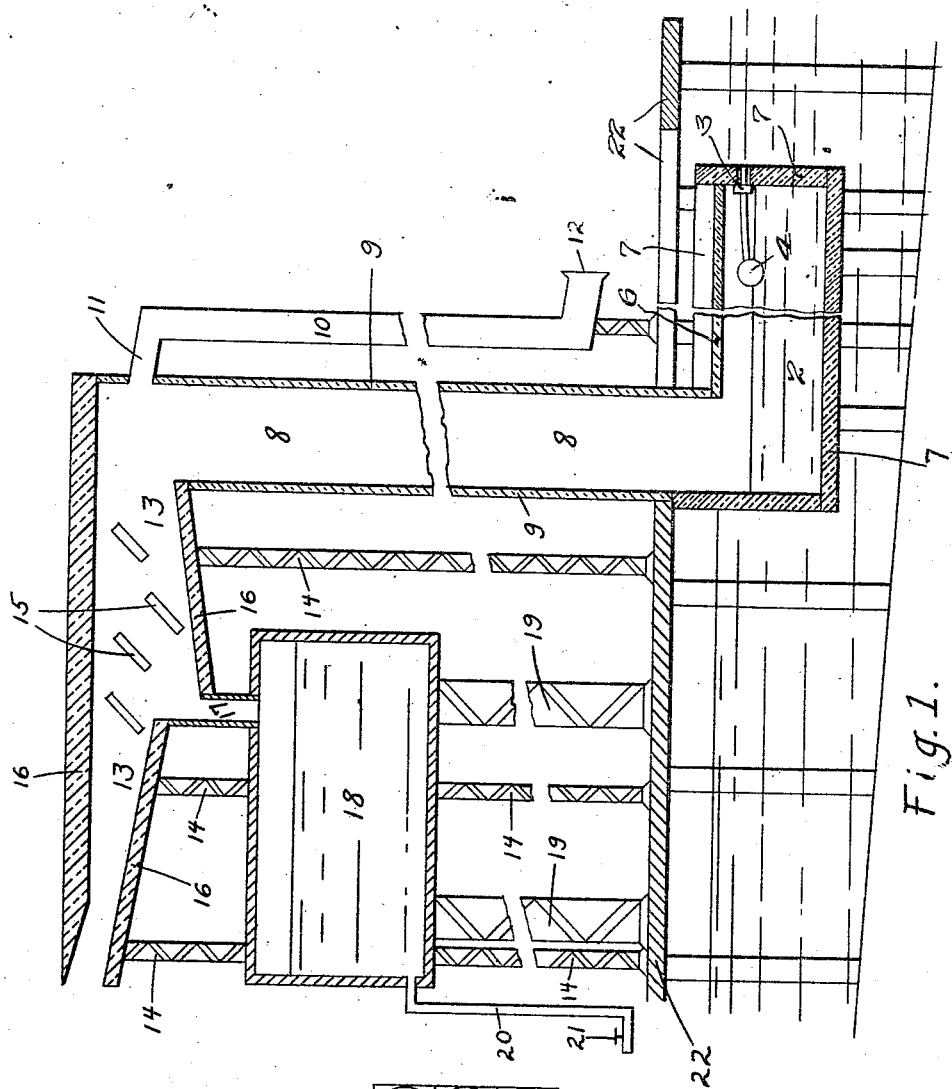
Fig. 1.
Fig. 2.
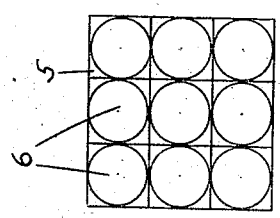
Inventor:
Hans Julius Nelson
By Francis St. J. Fox
Attorney Patented June 30, 1925.

1,544,029

UNITED STATES PATENT OFFICE.

HANS JULIUS NELSON, OF PALO ALTO, CALIFORNIA.

WATER LIFTER AND CONDENSER.

Application filed December 26, 1922. Serial No. 608,867.

*To all whom it may concern:*

Be it known that I, HANS JULIUS NELSON, a subject of Denmark, and a resident of the city of Palo Alto, county of Santa Clara, State of California, have invented Improvements in a Water Lifter and Condenser; and I do hereby declare the following to be a full, clear, and exact description of my invention, such as will enable others skilled in the art to which it appertains to make and use the same.

This invention relates to a natural water-lifter and condenser operated by means of the sun's rays; and it consists in the novel construction, combination and arrangement of parts, hereinafter described and later claimed.

The object of my invention is to produce distilled water for domestic, power, and irrigation purposes. I accomplish my purpose by utilizing the natural heat of the sun, rather than heat produced through combustion of wood, coal, oil, or gas; thereby eliminating the cost of such operations. By means of my novel construction, a detailed description of which hereinafter is given, the condensed water is raised to a suitable reservoir, or container, located above the level of the body of water from which it is drawn, and thereafter distributed for power, domestic, or irrigation purposes.

In order that my invention may be clearly understood and readily carried into effect, the same is described with reference to the accompanying drawings, in which similar numerals indicate like parts:

Fig. 1, is an elevation, partly in section, showing the construction and arrangement of parts of my apparatus.

Fig. 2, is a plan view of a detail of one section of frame and burning-glasses.

In detail, my construction consists of a shallow container, 2, comprised of tight jointed bottom, ends, and sides, adapted to receive and hold the water intended to be distilled. This container may be of any suitable shape; it is shown in the drawings as being rectangular in form. The container is partially submerged in the body of water from which the water to be distilled is to be drawn. The amount of water admitted to the container at any one time is automatically regulated by any suitable means; the means herein shown in the drawings consists of a valve, 3, and a float, 4.

The container is provided with a broad flat cover comprising a frame, 5, in which are suitably mounted a number of burning-glasses, 6, which collect the rays of the sun into a focus, producing intense heat. With the exception of the cover, the entire outside surface of the container is covered with suitable insulating material, 7, to prevent conduction of the heat produced by the sun's rays. Rising from the inner end of the container is a transparent stack, 8, preferably comprised of panes of glass, 9. Adjacent to the stack is an air-flue, 10, whose upper portion, 11, leads into the stack. The air-flue is provided at its lower end with a flared opening, 12, which serves as an inlet for air.

The stack, 8, opens into a conduit, 13, which constitutes a passage-way for the vapors rising in the stack from the heated water held in the container, 2. The conduit is supported by columns, 14. Cooling blades, 15, are placed transversely in the conduit near the stack. The conduit is covered throughout its course with insulation, 16. The central lower portion of the conduit is provided with an outlet pipe, 17, which leads into a tank, or reservoir, 18, suitably supported on columns, 19. Leading from the tank is a pipe, 20, provided with a gate-valve, 21 for distributing the condensed distilled water. A wharf, 22, supports the columns, and constitutes a working platform.

My apparatus is used as follows: Water is first let into the shallow container, 2, through the valve, 3, thereafter regulated by the float, 4. By the concentration of the sun's rays through the burning-glasses, 6, the water in the said container is heated. The vapors rising from the heated water pass off through the stack 8, and as the volume of water in the said container is diminished a new supply is admitted through the automatic operation of the said float. Condensation of the vapors takes place in the conduit, 13, due to the inflow of cooler air into the conduit through the air-flue, 10. The cooling blades, 15, assist in the condensation. The condensed water first caught in the conduit is led into the reservoir, 18, by means of the inlet-pipe, 17. The distilled water content in the reservoir may then be distributed for the purposes hereinabove outlined.

Having thus described my invention, what

I desire to secure and to claim by Letters Patent, is:

An apparatus for distilling water by means of solar heat, consisting of a container for water, a cover for said container, said cover comprised of a frame studded with burning-glasses for focusing the rays of the sun on the water held in the said container, a stack rising from said container for the purpose of providing a passage-way for vapors rising from the water heated in said container, an air-flue entering the top of said stack, a condensing chamber for said vapors, an outlet for said condensing chamber, a receptacle for condensed water and means for distributing the condensed distilled water.

In testimony whereof I have hereunto affixed my signature.

HANS JULIUS NELSON.